United States Patent
Aizawa et al.

(10) Patent No.: US 7,328,928 B2
(45) Date of Patent: Feb. 12, 2008

(54) VEHICLE REAR TRAY STRUCTURE

(75) Inventors: Nobuo Aizawa, Wako (JP); Jun Horiguchi, Wako (JP); Eiji Sakaguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 82 days.

(21) Appl. No.: 11/371,730

(22) Filed: Mar. 9, 2006

(65) Prior Publication Data

US 2006/0202498 A1    Sep. 14, 2006

(30) Foreign Application Priority Data

Mar. 10, 2005    (JP)    ............... 2005-066651

(51) Int. Cl.
*B62D 25/08*    (2006.01)
(52) U.S. Cl. ................................. 296/26.44
(58) Field of Classification Search ............. 296/24.44
See application file for complete search history.

(56) References Cited

U.S. PATENT DOCUMENTS

| | | | |
|---|---|---|---|
| 4,582,357 A * | 4/1986 | Nakamura et al. ..... | 296/203.03 |
| 6,126,232 A * | 10/2000 | Nakano .................. | 296/210 |
| 6,364,401 B1 * | 4/2002 | Kim ....................... | 296/203.02 |
| 6,764,124 B2 * | 7/2004 | Tohda et al. ............. | 296/96.12 |
| 6,854,767 B2 * | 2/2005 | Yakata et al. ........... | 280/808 |

FOREIGN PATENT DOCUMENTS

| JP | 5-92064 | 12/1993 |
|---|---|---|
| JP | 2001-80428 | 3/2001 |

* cited by examiner

*Primary Examiner*—Dennis H. Pedder
(74) *Attorney, Agent, or Firm*—Rankin, Hill, Porter & Clark LLP

(57) ABSTRACT

A rear tray 1 separates a vehicle room and a trunk from each other and includes a closed section part 6 formed integrally with the rear tray 1, the closed section part 6 extending in the width direction of a vehicle and having a polygonal section shape. In the rear tray 1, there is provided a connecting member 4 which connects together the opposite corners of the inside of the closed section part 6.

1 Claim, 4 Drawing Sheets

VEHICLE REAR TRAY STRUCTURE

BACKGROUND OF THE INVENTION

The present invention relates to a vehicle rear tray structure including a rear tray which separates a vehicle room and a trunk from each other and includes a polygonal-shaped closed section part formed integrally with the rear tray and extending in the vehicle width direction.

Conventionally, as a rear tray structure for enhancing the rigidity of the rear tray (rear package tray) of the vehicle, there is known a structure including first and second closed section parts which are respectively formed in the front and rear end portions of the rear tray and respectively extend in the vehicle width direction (for example, see the patent literature 1).

Further, there is also known a rear tray structure including a partition plate for dividing the closed section part formed in the rear tray into two sections along the vehicle width direction (for example, see the patent literature 2).

[Patent Literature 1]

Unexamined Japanese Utility Model Application Publication No. Hei5-92064 (Scope of the patent claims of Japanese utility model, FIG. 1)

[Patent Literature 2]

Unexamined Japanese Patent Application Publication No. 2001-80428 (Paragraphs 0010 to 0011, FIGS. 1 to 4)

The first and second closed section parts of the rear tray structure disclosed in the patent literature 1 are structured such that, to the portions of the rear tray which are bent substantially in an L shape when viewed from the side surface of the rear tray, there are connected the two end portions of a plate body (a cross member) which are formed symmetrical with the rear tray portions and have a substantially L-like shape.

In such structure of the closed section portions, however, for example, when vibrations are given to the structure, the two end portions of the plate body can be slided along the connecting surfaces thereof, or the shapes of the closed section parts can collapse into deformation or can be moved slightly. Therefore, in such structure, there is found a problem that the support rigidity of the structure is not sufficient and the vibrations of the rear tray in the vertical direction cannot be reduced.

Also, in the rear tray structure disclosed in the patent literature 2, in a plate body (a reinforcing panel) which forms the closed section part, there is formed an opening for entry of noises. Therefore, the strength of this closed section part is weak by a degree corresponding to the opening when compared with an ordinary closed section part and thus the closed section part can be resonant with noises.

Further, the partition plate is connected to the mutually opposite upper and lower sides of the closed section part formed in a prismatic shape when viewed from the side surface thereof. In the structure of the closed section part including such partition plate as well, similarly to the invention disclosed in the patent literature 1, when vibrations are applied, the mutually opposite sides can be slided, and the shape of the closed section part can collapse into deformation or the closed section part can be moved slightly, resulting in the insufficient support rigidity of the structure. Thus, even in the structure in which the partition plate is provided in the closed section part, there is found a problem that the vibrations of the rear tray in the vertical direction cannot be reduced.

In view of the circumstances of the prior art, it is an object of the invention to provide a vehicle rear tray structure which can reduce the vibrations of the rear tray in the vertical direction.

SUMMARY OF THE INVENTION

In attaining the above object, according to the invention as set forth in the first aspect, there is provided a vehicle rear tray structure including: a rear tray separating a vehicle room and a trunk from each other and integrally forming a closed section part with a polygonal section shape extending in the width direction of a vehicle, and a connecting member for connecting the opposed corners of the inside of the closed section part.

According to the invention as set forth in the first aspect, since the connecting member is connected to the opposed corners of the inside of the closed section part having a polygonal section shape, there is formed a polygonal-shaped closed section part in which the number of sides of the polygonal section shape is reduced, thereby being able to enhance the strength of the closed section part. Also, due to connection of the connecting member between the opposite corners, the opposite corner portions of the closed section part provide a state in which three sides are connected together. Therefore, vibrations and loads are received equally by the connecting member, one side and the other side of the closed section part to thereby avoid the centralization of stresses. Thus, the closed section part is enhanced in strength to thereby be able to restrict the deformation of the section thereof. As a result, the vibrations of the rear tray can be reduced and the support rigidity of the rear tray supporting equipment mounted on the rear tray can be increased.

According to the invention as set forth in the second aspect, in a vehicle rear tray structure as set forth in the first aspect, the closed section part is formed by connecting the two end portions of a substantially recess-shaped plate body to the rear tray, and the connecting member connects the two end portions with being held between the rear tray and the plate body.

According to the invention as set forth in the second aspect, simultaneously when the rear tray and plate body are connected together to thereby form the closed section part, the connecting member can be fixed. This does not increase the number of fixing portions nor the number of assembling steps, so that the connecting member can be mounted easily.

According to the invention as set forth in the third aspect, in a vehicle rear tray structure as set forth in the first or second aspect, the connecting member is formed in a band shape, and is disposed substantially in the central portion of the vehicle in the vehicle width direction.

According to the invention as set forth in the third aspect, since the connecting member is formed in a band shape, the rear tray with the connecting member mounted thereon is small in volume so that the weight of the rear tray is not increased greatly. Also, because the connecting member is disposed substantially in the central portion of the vehicle in the vehicle width direction which corresponds to the middle portion of waves when the rear tray is vibrated, the vertical vibrations of the rear tray can be restricted effectively and thus the vibrations of the rear tray can be reduced.

According to a vehicle rear tray structure of the invention, not only the section deformation of the closed section part of the rear tray can be restricted to thereby enhance the strength thereof but also the vibrations of the rear tray can be reduced.

BRIEF DESCRIPTION OF THE DRAWINGS

FIG. 4 shows the magnitude of the vertical vibrations of the rear tray when it is vibrated.

FIG. 5 is views of the modifications of a vehicle rear tray structure according to the invention.

DETAILED DESCRIPTION OF THE PREFERRED EMBODIMENTS

Next, description will be given below of the best mode (which will be hereinafter referred to as an embodiment) for carrying out the invention with reference to FIGS. 1 to 5. By the way, the term "front" means the advancing direction side of a vehicle, while the term "rear" means the retreating direction side of the vehicle.

Figure 1:
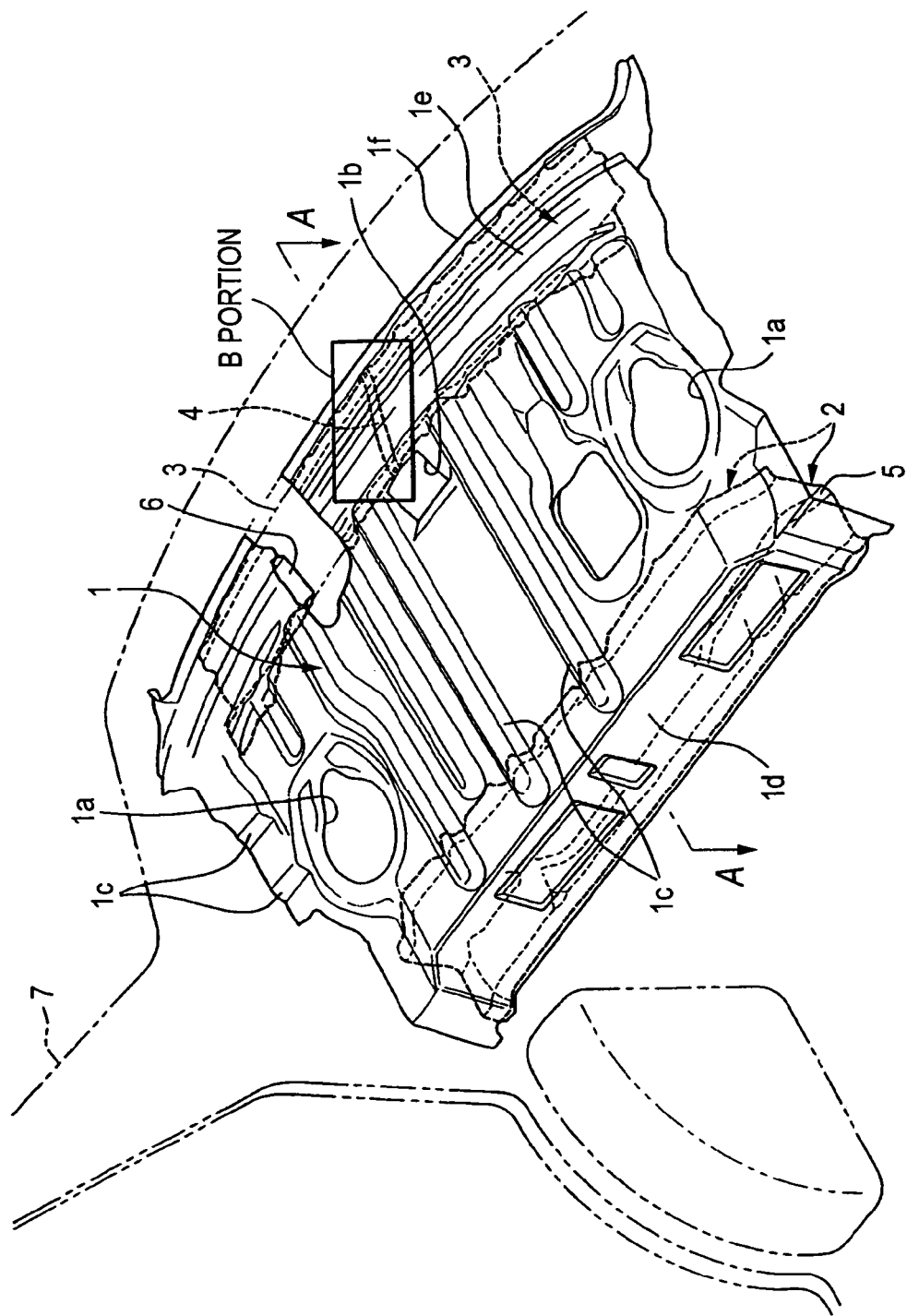
FIG. 1 is a partially sectional perspective view of the main portions of a vehicle rear tray structure according to the embodiment of the invention.

FIG. 1 is a partially sectional perspective view of the main portions of a vehicle rear tray structure according to the embodiment of the invention.

<Rear Tray>

As shown in FIG. 1, a rear tray 1 is a plate-shaped member which, in a vehicle, partitions the inside of a vehicle room from a trunk (a baggage room) and constitutes the ceiling of the trunk; and, the rear tray 1 is disposed horizontally on the rear side of a rear seat between right and left rear pillar garnishes 7. The rear tray 1 includes a metal plate such as a steel plate which, for example, includes two speaker installation holes 1a respectively formed in the right and left portions thereof, a lamp installation hole 1b formed centrally in the rear portion thereof, more than one air louver installation hole (not shown) formed in the rear portion thereof for installation of air louvers, and holes for mounting fasteners. In the respective portions of the rear tray 1, there are formed reinforcing bent portions 1c which are press formed in a projection-like shape, in a recess-like shape and in an inclined-surface-like shape toward the vehicle front and rear direction or toward the vehicle width direction. By the way, on the upper surface of the rear tray 1, there is mounted a plate-shaped cover member removably and stably by a resin-made clip or a securing piece.

In FIG. 1, the speaker installation hole 1a is a hole which is used to install a speaker. The lamp installation hole 1b is a hole for installation of a high-mount lamp. By the way, reference character 1d designates the front end portion of the rear tray 1, 1e the rear end portion of the rear tray 1, 1f a flange portion, 2 and 3 plate bodies, 4 a connecting member, and 5, 6 closed section parts, respectively.

Figure 2:
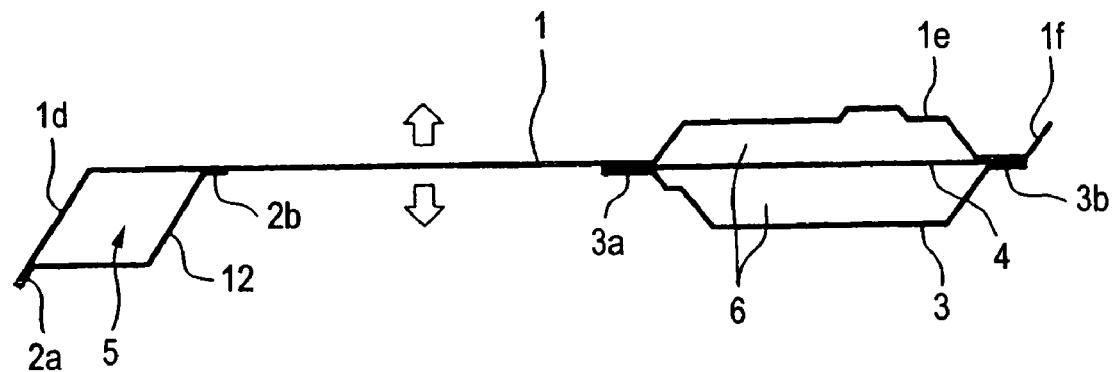
FIG. 2 is a section view, taken along the lines A-A shown in FIG. 1.
Figure 3:
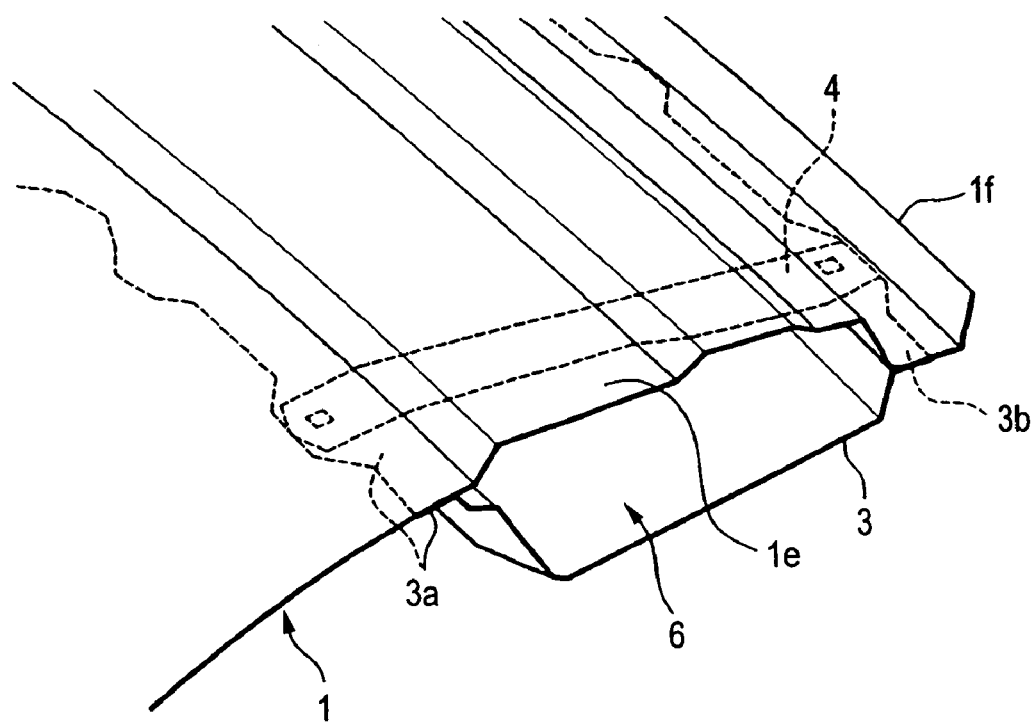
FIG. 3 is an enlarged section view of the B portion shown in FIG. 1.

FIG. 2 is a section view, taken along the lines A-A shown in FIG. 1. FIG. 3 is an enlarged section view of the B portion shown in FIG. 1.

As shown in FIG. 2, the rear tray 1 is structured such that, when viewed from the side surface thereof, its front end portion 1d is bent at an obtuse angle toward the lower side, and its rear end portion 1e expands slightly upwardly and is bent in two or more portions thereof so as to have a substantially convex-like shape, thereby reinforcing the rear tray 1. To the front end portion 1d, there is welded a substantially recess-shaped plate body 2 in such a manner that a closed section part 5 having a polygonal section shape and extending in the vehicle width direction is formed integrally with the front end portion 1d and plate body 2. To the rear end portion 1e, there is welded a substantially recess-shaped plate body 3 in such a manner that a closed section part 6 having a polygonal section shape and extending through the connecting member 4 in the vehicle width direction is formed integrally with 1e and plate body 3. By the way, in the rear-most end of the rear end portion 1e, there is formed the flange portion 1f.

<Plate Body>

The plate bodies 2, 3 are members which are respectively used to form the closed section parts 5, 6 for reinforcement of the rear tray 1; and, each plate body is made of, for example, a metal plate such as a steel plate which is long in the vehicle width direction.

The substantially central portion of the plate body 2 is bent at an obtuse angle (substantially symmetrically with the front end portion 1d) so as to correspond to the shape of the front end portion 1d, and the plate body 2 is disposed on the lower side of the front end portion 1d of the rear tray 1 in such a manner that it forms the closed section part 5. The front-and-rear-direction two end portions of the plate body 2 respectively include collar portions which are bent so as to coincide with the lower surface of the rear tray 1, while these collar portions are welded to the lower surface of the rear tray 1.

The plate body 3 is disposed on the lower side of the rear end portion 1e of the rear tray 1 and is bent in a substantially recess-like shape when viewed from the side surface thereof. The front-and-rear-direction two end portions 3a, 3b of the plate body 3 respectively include collar portions which are bent formed flat so as to be contacted with the lower surface of the rear tray 1, while these collar portions are welded to the lower surface of the rear tray 1 with the connecting member 4 between them.

<Closed Section Part>

The closed section part 5 is formed in order to enhance the strength of the front end portion 1d of the rear tray 1; and, to form the closed section part 5, the two end portions 2a, 2b of the substantially L-shaped plate body 2 are connected to the lower surface of the front end portion 1d to thereby provide a parallelogram longitudinal section shape extending in the vehicle width direction.

Also, the closed section part 6 is formed in order to enhance the strength of the rear end portion 1e of the rear tray 1; and, to form the closed section part 6, the two end portions 3a, 2b of the substantially recess-shaped plate body 3 are connected to the lower surface of the rear end portion 1e of the substantially projection-shaped to thereby provide a substantially hexagonal longitudinal section shape extending in the vehicle width direction. In this closed section part 6, the two end portions 3a, 3b of the plate body 3 and the connecting portions of the rear tray 1 to which the two end portions 3a, 3b are connected so as to provide substantially hexagonal corners.

<Connecting Member>

The connecting member 4 is a reinforcing member to further enhance the strength of the closed section part 6 and includes a single band-shaped member made of metal such as steel. The connecting member 4 is disposed in such a manner that it connects the opposite corners of the inside of the substantially hexagonal-shaped closed section part 6. The two end portions of the connecting member 4 in the longitudinal direction thereof are spot welded while they are held by and between the rear tray 1 and the end portions 3a, 3b of the plate body 3 in the front-and-rear direction thereof, and are thereby connected between of the two end portions 3a, 3b of the plate body 3. The connecting member 4, as shown in FIG. 1, is disposed in the substantially central portion of the vehicle in the width direction of the vehicle such that it extends in the front-and-rear direction of the vehicle.

<Operation>

Next, description will be given below of the operation of the vehicle rear tray structure according to the embodiment of the invention with reference to FIGS. 2-4 while comparing it with a comparison example.

As shown in FIG. 2, the rear tray 1 is vibrated in the vertical direction as shown by arrow marks C, D due to a so called confined sound made within the vehicle room or an unpleasant noise generated by a speaker. Also, on the rear tray 1, there are provided several kinds of equipment (not shown) such as the speaker and the load of the equipment is applied in the downward direction shown by the arrow mark D.

Figure 4A:
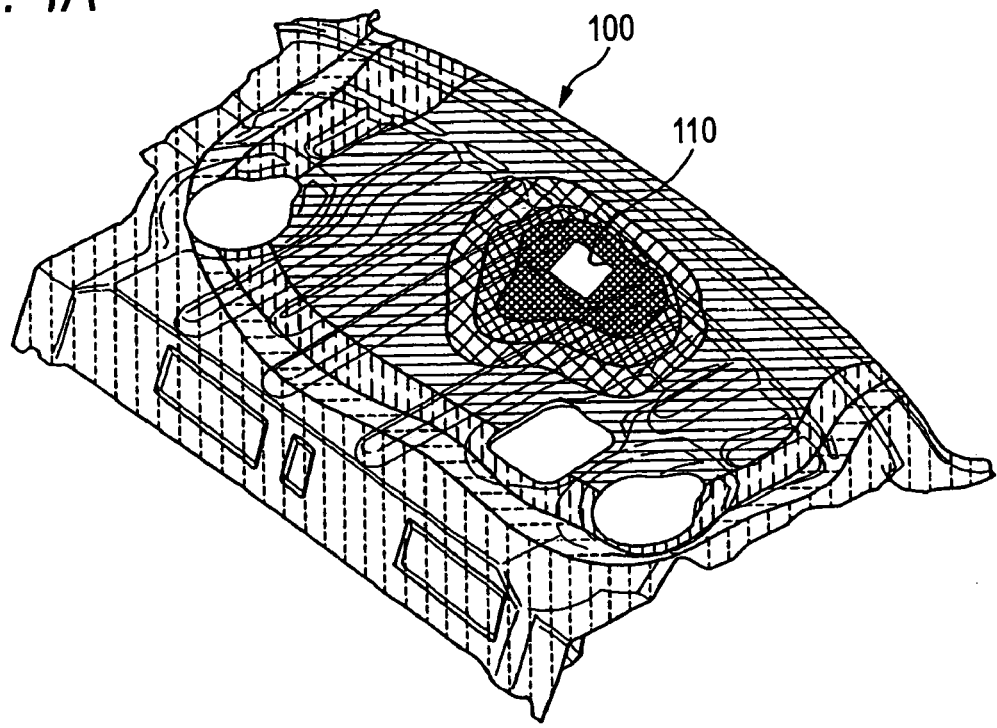
FIG. 4A is a perspective view of the vertical vibration state of a rear tray according to the comparison example with no connecting member provided therein.
Figure 4B:
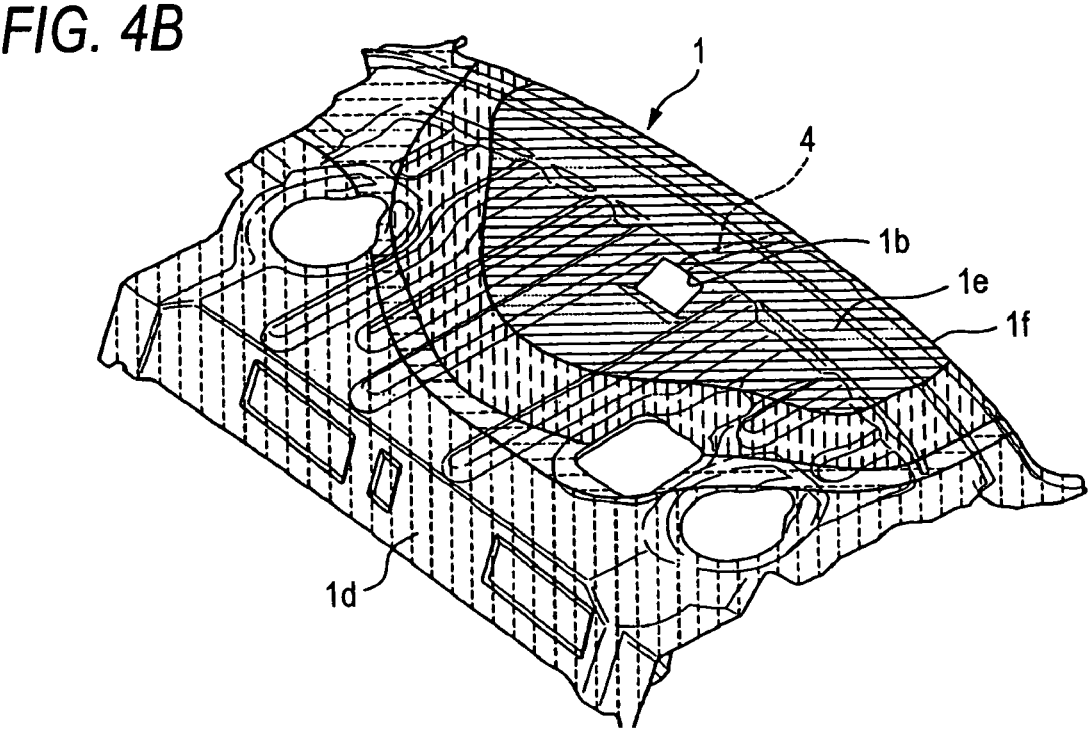
FIG. 4B is a perspective view of the vertical vibration state of a rear tray according to the invention in which a connecting member is provided.

FIG. 4 is a view to show the magnitude of the vertical vibrations of the rear tray when it is vibrated. Specifically, FIG. 4A is a perspective view of the rear tray according to the comparison example with no connecting member provided therein, showing the vertical vibration state thereof; and, FIG. 4B is a perspective view of the rear tray according to the invention with the connecting member provided therein, showing the vertical vibration state thereof.

The comparison rear tray 100 without the connecting member 4, as the vibration state thereof is shown by hatchings and contour lines in FIG. 4A, is vibrated relatively greatly about a lamp installation hole 110 which is formed in the slightly near-to-rear portion of the central portion of the rear tray 100.

On the other hand, in the rear tray 1 with the connecting member 4 provided therein according to the invention, as the vibration state thereof is shown by hatchings and contours in FIG. 4B, the vibration of the rear tray 1 is cut by half (reduced) and the rear tray 1 is vibrated slightly about a lamp installation hole 1b.

That is, as shown in FIG. 2, owing to provision of the connecting member 4, the vibrations of the rear tray 1 in the vertical direction shown by the arrow marks C, D are dispersed to the rear tray 1, plate body 3 and connecting member 4 in the closed section part 6 to thereby prevent the centralization of stresses. This restricts the deformation of the closed section part 6 and thus the vibrations of the rear tray 1 can be reduced.

And, the load applied to the rear tray 1 in the downward direction shown by the arrow mark D by the equipment is similarly dispersed to the rear tray 1, plate body 3 and connecting member 4 to thereby restrict the deformation of the closed section part 6. As a result, the support rigidity of the equipment by the rear tray 1 is enhanced. By the way, in the closed section part 6, the load is applied in a direction to crush and deform the closed section part 6, while a tensile force is applied to the connecting member 4. Therefore, since the connecting member 4 may be formed to have such strength as can withstand the tensile force, the connecting member 4 can include a thin metal-made plate member. Also, when the thickness of the rear tray 1 is increased, the strength thereof can be enhanced, which can reduce the vibrations of the rear tray 1.

On the other hand, in the closed section part 5, the vibrations and loads applied in the upward and downward directions of the arrow marks C, D are dispersed by the rear tray 1 and plate body 2.

<Modification>

By the way, the invention is not limited the above embodiment but various changes and modifications are possible without departing from the scope of the technical idea thereof. That is, of course, the invention also applies to these changes and modifications.

For example, the connecting member 4 is not limited to one which, as shown in FIG. 2, is fixed to both of the connecting portions between the rear tray 1 and plate body 3 cooperating together to form the substantially hexagonal closed section parts 6 when viewed from the side surface thereof.

Next, description will be given below of how to connect connecting members 41-46 to their respective closed section parts with reference to FIGS. 5A to 5F.

FIGS. 5A to 5F shows the modifications of the vehicle rear tray according to the invention, while FIGS. 5A to 5F are section views of the respective modifications of the closed section part.

Figure 5A:
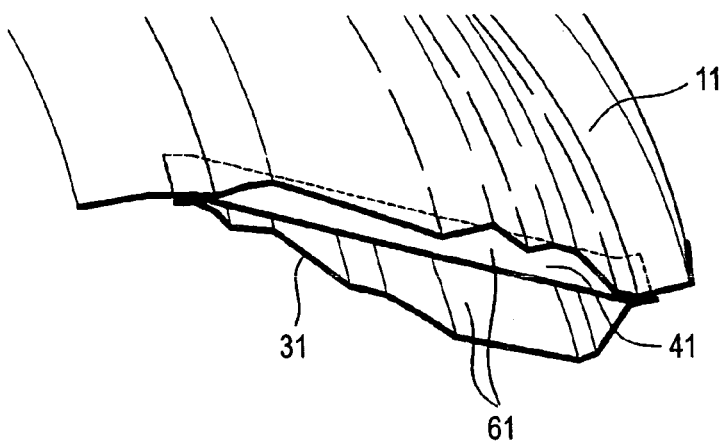
FIGS. 5A to 5F are respectively views of the main portions of the modifications of the closed section parts.

As shown in FIG. 5A, for example, in the case of the connecting member 41, a substantially projection-shaped rear tray 11 including two or more bent portions and a substantially recess-shaped plate body 31 including two or more bent portions formed asymmetric with the rear tray 11 are used to form closed section parts 61 each long obliquely and having a polygonal section shape; and, the closed section parts 61 may be fixed to between the rear tray 11 and the two end portions of the plate body 31 in the front-and-rear direction thereof. In this case as well, since the connecting member 41 is connected between the opposite corners of the inside of the closed section part 61, similarly to the above embodiment, vibrations and loads can be reduced effectively. In this manner, the connecting member 41 may be interposed between the proper opposite corners of the closed section part 61.

Figure 5B:
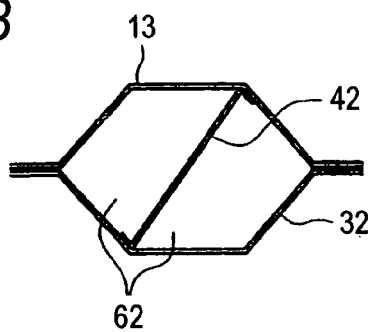

As shown in FIG. 5B, in the case of closed section parts 62 each having a hexagonal shape when viewed from the side surface thereof, which are formed by the substantially projection-shaped portions of a rear tray 12 and a plate body 32 having a substantially recess-like shape, a connecting member 42 may be interposed between the opposite corners of the closed section part 62 in such a manner that the bent formed corners are connected together by a diagonal.

Figure 5C:
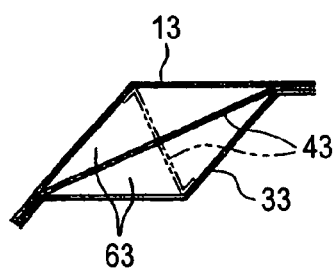

As shown in FIG. 5C, in the case of closed section parts 63 each having a rectangular shape when viewed from the side surface thereof, which are formed by the substantially projection-shaped portion of a rear tray 13 and a plate body 33 bent asymmetric with the rear tray 13, a connecting member 43 may be interposed between the opposite corners of the closed section parts 63 in such a manner that the rear tray 13 and plate body 33 hold between them the front-and-rear-direction two end portions of the connecting member 43. Also, in this case, the connecting member 43, as shown by a virtual line, may also be interposed between the opposite corners in such a manner that the bent formed corners (bent portions) of the closed section parts 63 are connected together by a diagonal.

By the way, when the shape of the closed section part 63 is square, if the diagonals are connected together by the connecting member 43, there are formed triangular closed section parts 63 so that the strength of the rear tray 13 can be enhanced. In this manner, the connecting member 43 may be preferably connected in such a manner that triangles are formed in the polygonal section-shaped closed section parts 63.

Figure 5E:
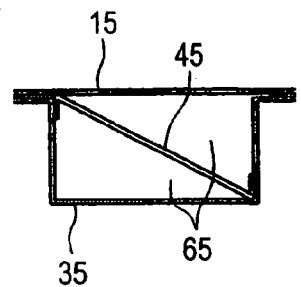
Figure 5D:
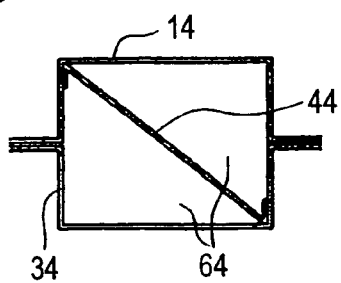

As shown in FIG. 5D, in the case of closed section parts 63 having a substantially square shape when viewed from the side surface thereof, which are formed by the U-like and projection-shaped portions of a rear tray 14 and a plate body 34 having a U-like and recess-shaped plate body 34, similarly to the above, a connecting member 44 may be interposed between the opposite corners in such a manner that the bent formed corners (bent portions) of the closed section parts 64 are connected together by diagonals.

As shown in FIG. 5E, in the case of closed section parts 65 each having a rectangular shape when viewed from the side surface thereof, which are formed by the flat portion of a rear tray 15 and a U-like and recess-shaped plate body 35, a connecting member 45 may be interposed between the opposite corners of the closed section part 65 in such a manner that connecting portions (corners) between the rear tray 15 and plate body 35 are connected to corners (bent portions) formed by bending the plate body 35 by diagonals.

Figure 5F:
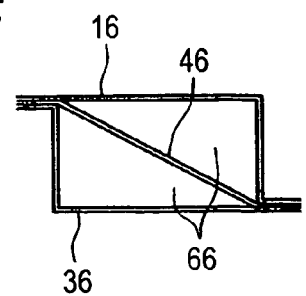

As shown in FIG. 5F, in the case of closed section parts 66 each having a rectangular shape when viewed from the side surface thereof, which are formed by the substantially L-shaped bent portion of a rear tray 16 and a substantially L-shaped plate body 36, a connecting member 46 may be disposed in such a manner that the bent formed connecting portions (corners) are connected together by a diagonal.

By the way, the number of provision of the connecting member 4 is not limited to the structure shown in FIG. 1 in which a single connecting member is installed in the substantially central portion of the rear tray 1 in the vehicle width direction, but two or more connecting members 4 may also be provided in the proper portions of the rear tray 1 to thereby further enhance the strength of the rear tray 1 with respect to the vibrations and loads thereof. In this case, the connecting members 4, like the connecting members 43 shown by a solid line and a virtual line in FIG. 5C, may be disposed to cross each other when they are viewed from the side surface thereof.

Further, the connecting member 4 is not limited to the band-like shape as shown in FIGS. 1 and 3. The connecting member 4 may be a wire-shaped or wide plate member.

What is claimed is:

1. A vehicle rear tray structure comprising:
    a rear tray separating a vehicle room and a trunk from each other and integrally forming a closed section part with a substantially recess-shaped plate body extending in a width direction of a vehicle, and
    a connecting member of limited width with respect to a width of the tray connecting opposed corners of the inside of the closed section part,
    wherein the closed section part is formed by connecting two end portions of the substantially recess-shaped plate body to the rear tray,
    wherein the connecting member connects the two end portions while being held between the rear tray and the plate body and is disposed substantially in a central portion of the vehicle in the width direction of the vehicle,
    wherein the rear tray is comprised of a thick-metal plate member and the connecting member is comprised of a thin-metal plate member formed in a band shape,
    wherein the connecting member has a thickness less than a thickness of the rear tray, and
    wherein the connecting member can withstand a tensile force caused by a load impact to the rear tray thereby restricting deformation to the closed section part.

\* \* \* \* \*